United States Patent
Andrews

(10) Patent No.: US 10,251,326 B2
(45) Date of Patent: Apr. 9, 2019

(54) ROW UNIT ASSEMBLY WITH CLAMP MOUNT FOR AN AGRICULTURAL IMPLEMENT

(71) Applicant: CNH Industrial America, LLC, New Holland, PA (US)

(72) Inventor: Jason E. Andrews, Goodfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 171 days.

(21) Appl. No.: 15/364,432

(22) Filed: Nov. 30, 2016

(65) Prior Publication Data
US 2018/0146609 A1    May 31, 2018

(51) Int. Cl.
| A01B 61/04 | (2006.01) |
| A01C 5/06 | (2006.01) |
| A01B 35/28 | (2006.01) |
| A01C 7/20 | (2006.01) |
| A01C 23/02 | (2006.01) |

(52) U.S. Cl.
CPC ............ *A01B 61/046* (2013.01); *A01B 35/28* (2013.01); *A01B 61/04* (2013.01); *A01B 61/044* (2013.01); *A01C 5/064* (2013.01); *A01C 7/201* (2013.01); *A01C 5/066* (2013.01); *A01C 7/205* (2013.01); *A01C 23/025* (2013.01)

(58) Field of Classification Search
CPC ...... A01B 61/04; A01B 61/044; A01B 61/046
See application file for complete search history.

(56) References Cited

U.S. PATENT DOCUMENTS

| 2,593,176 A | 4/1952 | Patterson |
| 2,922,480 A | 1/1960 | Seng |
| 2,936,726 A | 5/1960 | Gandrud |
| 3,425,755 A * | 2/1969 | Harris ..................... A01B 23/02 |
| | | 172/763 |
| 4,011,915 A * | 3/1977 | Anderson .............. A01B 35/24 |
| | | 172/265 |
| 4,033,538 A | 7/1977 | Levy |

(Continued)

FOREIGN PATENT DOCUMENTS

| GB | 809825 | 3/1959 |
| WO | WO 8601680 | 3/1986 |

OTHER PUBLICATIONS

Prior Art Mount No. 1.
Prior Art Mount No. 2.

*Primary Examiner* — Alicia Torres
(74) *Attorney, Agent, or Firm* — Rebecca L. Henkel; Rickard K. DeMille

(57) ABSTRACT

A row unit assembly may generally include a clamp mount configured to be coupled to a frame member of an agricultural implement. The clamp mount may include a first clamp member and a second clamp member pivotally coupled to the first clamp member. The first clamp member may include a first clamp wall spaced apart from a second clamp wall of the second clamp member such that the frame member is clamped between the first and second clamp walls. In addition, the second clamp member may include a flange extending outwardly relative to the second clamp wall such that the flange overlaps the frame member along at least a portion of a top side of the frame member. Moreover, the row unit assembly may include an agricultural row unit including at least one support arm pivotally coupled to the clamp mount.

19 Claims, 9 Drawing Sheets

(56) References Cited

U.S. PATENT DOCUMENTS

| | | | |
|---|---|---|---|
| 4,377,979 A | | 3/1983 | Peterson et al. |
| 4,461,358 A | * | 7/1984 | Lewison .............. A01B 61/046 172/705 |
| 4,574,715 A | | 3/1986 | Dietrich, Sr. et al. |
| 4,574,891 A | | 3/1986 | Williamson |
| 4,842,077 A | | 6/1989 | Peterson, Jr. et al. |
| 4,962,918 A | | 10/1990 | Yang |
| 5,361,848 A | | 11/1994 | Fleischer et al. |
| 5,865,131 A | * | 2/1999 | Dietrich, Sr. .......... A01C 5/062 111/121 |
| 6,012,534 A | * | 1/2000 | Kovach ................. A01B 13/08 172/156 |
| 6,564,728 B2 | * | 5/2003 | Ryan .................... A01B 61/046 111/123 |
| 6,973,884 B2 | * | 12/2005 | Dietrich, Sr. .......... A01C 5/062 111/121 |
| 8,544,395 B2 | * | 10/2013 | Dietrich, Sr. ........ A01C 23/022 111/121 |
| 8,596,374 B2 | * | 12/2013 | Kile ....................... A01B 23/02 172/265 |
| 8,794,165 B2 | | 8/2014 | Martin |
| 8,813,865 B2 | | 8/2014 | Renyer et al. |
| 9,226,437 B2 | | 1/2016 | Dietrich, Sr. |
| 2015/0150184 A1 | * | 6/2015 | Dietrich, Sr. .......... A01C 5/064 111/121 |
| 2015/0245557 A1 | | 9/2015 | Bruer et al. |

\* cited by examiner

ROW UNIT ASSEMBLY WITH CLAMP MOUNT FOR AN AGRICULTURAL IMPLEMENT

FIELD OF THE INVENTION

The present subject matter relates generally to agricultural implements and, more particularly, to a row unit assembly including a clamp mount for coupling an agricultural row unit to a frame of an agricultural implement.

BACKGROUND OF THE INVENTION

Typically, agricultural implements are towed behind a tractor or other work vehicle via a hitch assembly secured to a rigid frame of the implement. For example, fertilizer application implements typically include a plurality of row units, with each row unit being mounted to the implement frame. As is generally understood, each row unit may include one or more ground engaging tools or openers that form a path for fertilizer deposition into the soil. Specifically, the openers may be used to break the soil, thereby enabling injection nozzles or knives (e.g., positioned behind the openers) to deposit fertilizer at a desired depth beneath the soil surface. Using such an implement, fertilizer may be distributed throughout a field, either before or after planting, to facilitate enhanced crop development.

To date, various mounting assemblies have been developed to facilitate mounting an agricultural row unit to the rigid frame of an implement, such as a fertilizer application implement. However, conventional mounting assemblies typically fail to provide a complete mounting package suitable for use across various applications. For instance, many conventional mounting assemblies are only configured to be coupled to a frame bar of a given size, thereby limiting the usability of such mounting assemblies. To address this issue, mounting assemblies have been developed that accommodate differing frame bar sizes. However, these mounting assemblies are typically quite large and complex. As a result, such mounting assemblies are often not capable of being used in applications in which there is a narrow space envelope relative to an implement frame for coupling a row unit to the frame.

Accordingly, an improved row unit assembly including a clamp mount for coupling an agricultural row unit to an implement frame that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a row unit assembly configured to be supported on a frame member of a work vehicle implement, wherein the frame member includes a top side, a bottom side, and first and second lateral sides. The row unit assembly may generally include a clamp mount configured to be coupled to the frame member. The clamp mount may include a first clamp member and a second clamp member pivotally coupled to the first clamp member. The first clamp member may include a first clamp wall spaced apart from a second clamp wall of the second clamp member such that, when the frame member is clamped between the first and second clamp walls, the first clamp wall is configured to be positioned adjacent to the first lateral side of the frame member and the second clamp wall is configured to be positioned adjacent to the second lateral side of the frame member. In addition, the second clamp member may include a flange extending outwardly relative to the second clamp wall in the direction of the first clamp wall such that the flange is configured to overlap the frame member along at least a portion of the top side of the frame member. Moreover, the row unit assembly may include an agricultural row unit including at least one support arm pivotally coupled to the clamp mount. The support arm(s) may be configured to support an opener disc, a gauge wheel, and a closing wheel relative to the clamp mount.

In another aspect, the present subject matter is directed to an agricultural implement including an implement frame. The implement frame may include at least one frame member, with the frame member(s) including a top side, a bottom side, and first and second lateral side. The implement may also include a plurality of row unit assemblies supported by the implement frame. Each row unit assembly may include a clamp mount coupled to the frame member(s). The clamp mount may include a first clamp member and a second clamp member pivotally coupled to the first clamp member. The first clamp member may include a first clamp wall spaced apart from a second clamp wall of the second clamp member such that, when the frame member(s) is clamped between the first and second clamp walls, the first clamp wall is positioned adjacent to the first lateral side of the frame member(s) and the second clamp wall is positioned adjacent to the second lateral side of the frame member(s). In addition, the second clamp member may include a flange extending outwardly relative to the second clamp wall in the direction of the first clamp wall such that the flange overlaps the frame member(s) along at least a portion of the top side of the frame member(s). Moreover, the implement may include an agricultural row unit including at least one support arm pivotally coupled to the clamp mount. The support arm(s) may be configured to support an opener disc, a gauge wheel, and a closing wheel relative to the clamp mount.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
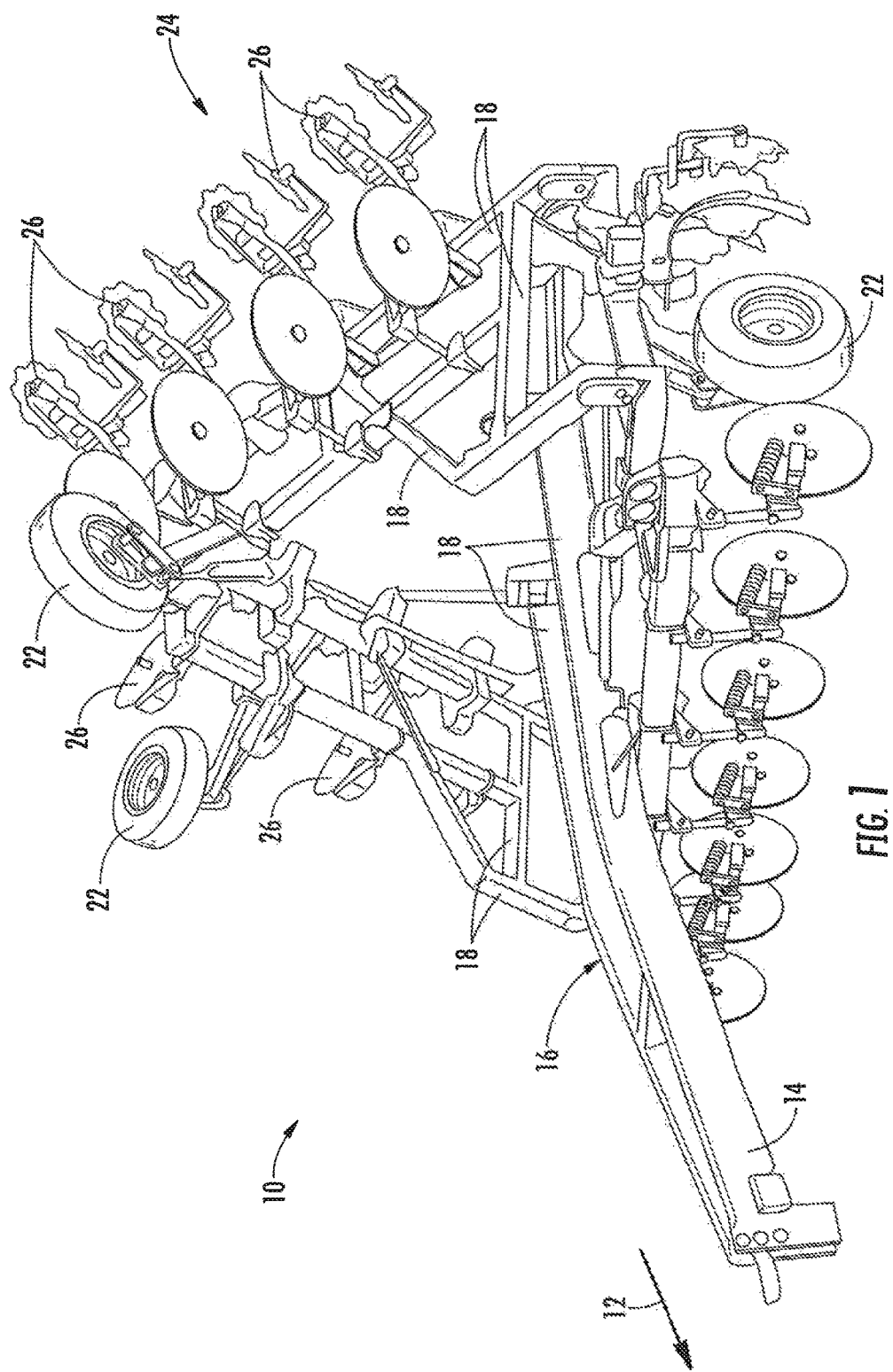
FIG. 1 illustrates a perspective view of one embodiment of an agricultural implement configured to be towed behind a work vehicle, such as a tractor or other agricultural vehicle, in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a row unit assembly including a clamp mount for coupling an agricultural row unit to a bar or frame member of the frame of a corresponding agricultural implement. As will be described below, the clamp mount may include a first clamp member, a second clamp member configured to be pivotally coupled to the first clamp member, and a mount base coupled to the first clamp member that is configured to be coupled to the row unit to allow the row unit to pivot relative to the clamp mount. The clamp members may generally be configured to be clamped against the front and rear sides of the frame member. Moreover, in several embodiments, each clamp member may include one or more outwardly extending projections or flanges configured to overlap a portion of the top side of the frame member when the clamp members are clamped against the front and rear sides of the frame member. Additionally, in one embodiment, all or a portion of the flanges may be configured to penetrate into one or both of the upper radiused or rounded corners of the frame member when the clamp mount is secured to the frame member, thereby providing an additional clamping force between the clamp mount and the frame member.

It should be appreciated by those of ordinary skill in the art that the disclosed clamp mount provides a mounting assembly that can be easily assembled in the field. Additionally, the disclosed clamp mount requires less hardware than typical mounting assemblies, thereby reducing its overall weight. Moreover, the disclosed clamp mount provides an interface for mounting the row unit forward of the frame member to which the clamp mount is secured, thereby providing maximum clearance for applications in which there is a narrow space envelope for coupling the row unit to the frame.

Referring now to FIG. 1, a perspective view of one embodiment of an agricultural implement 10 is illustrated in accordance with aspects of the present subject matter. As shown, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a main frame 16 of the implement 10 to facilitate towing the implement 10 in the direction of travel 12.

In general, the implement frame 16 may include a plurality of structural frame members 18, such as beams, bars, and/or the like, configured to support a plurality of components. Additionally, a pair of wheels 22 may be coupled to the implement frame 16 that support the weight of the frame 16, thereby enabling the implement 10 to be towed across the field.

Moreover, as shown in FIG. 1, the implement 10 may also include a tool bar assembly 24. As is generally understood, the tool bar assembly 24 may include a plurality of row unit assemblies 26 coupled to the implement frame 16 (e.g., via one or more of the frame members 18), with each row unit assembly 26 configured to receive the flowable agricultural product, such as fluid fertilizer (e.g., anhydrous ammonia), from a storage tank (not shown). As will be described below, each row unit assembly 26 may include a ground engaging tool (e.g., an opener disc) configured to break the soil, thereby excavating a trench into the soil. Additionally, each row unit assembly 26 may also include one or more fluid dispersal components (e.g., knives or injections nozzles and associated tubing) positioned behind the ground engaging tool and configured to deposit flowable agricultural product from the storage tank into the trench formed by the ground engaging tool. Accordingly, the flowable agricultural product, such as fluid fertilizer, may be distributed throughout a field, either before or after planting, to facilitate enhanced crop development.

It should be appreciated that, in the illustrated embodiment, the tool bar assembly 24 is shown in a raised position. However, as is generally understood, the tool bar assembly 24 may be lowered to a lowered position to allow one or more components of each row unit assembly 26 to engage the ground.

It should also be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
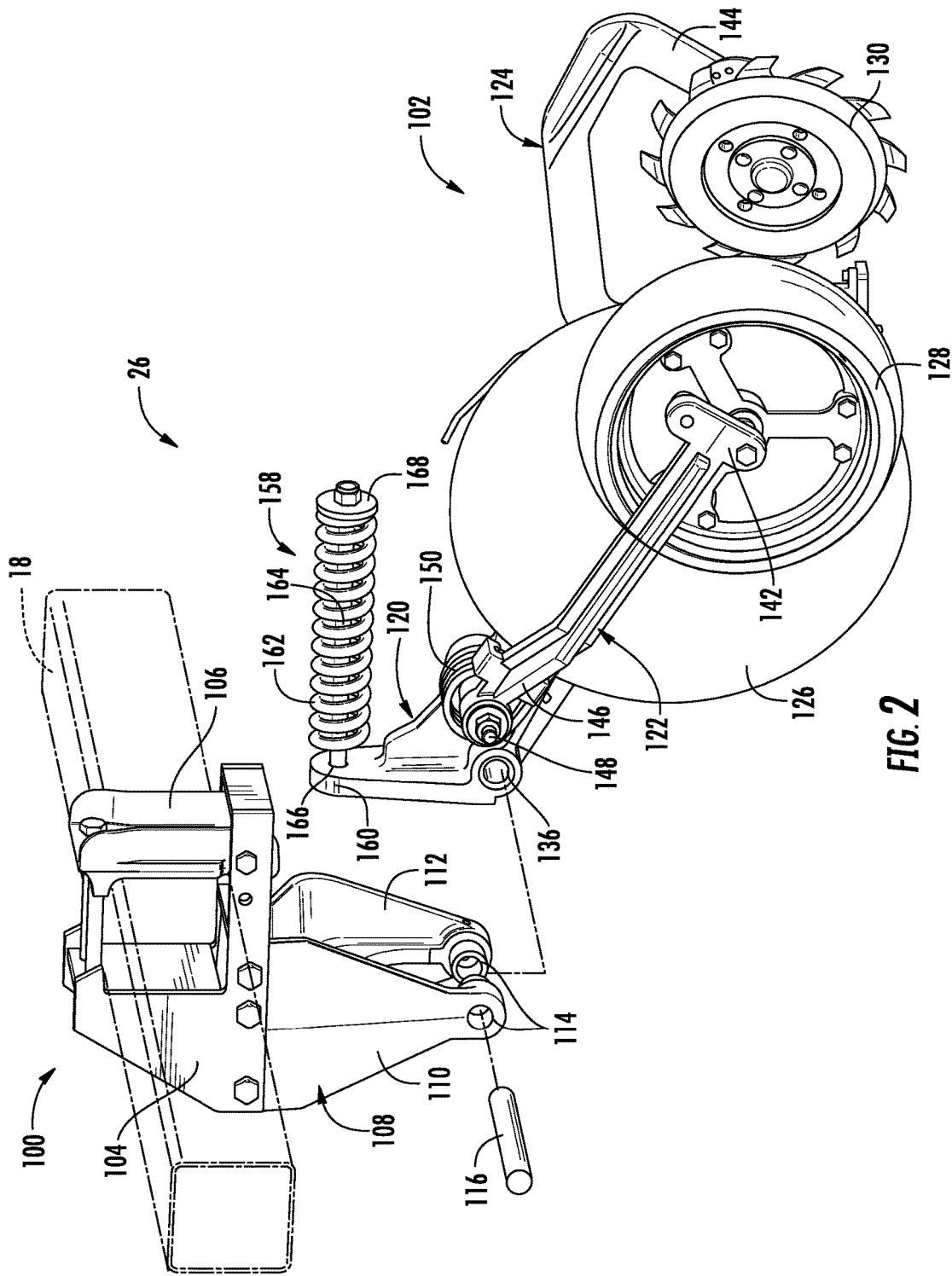
FIG. 2 illustrates an exploded, perspective view of one embodiment of a row unit assembly in accordance with aspects of the present subject matter, particularly illustrating a clamp mount of the row unit assembly exploded away from an agricultural row unit of the row unit assembly.
Figure 3:
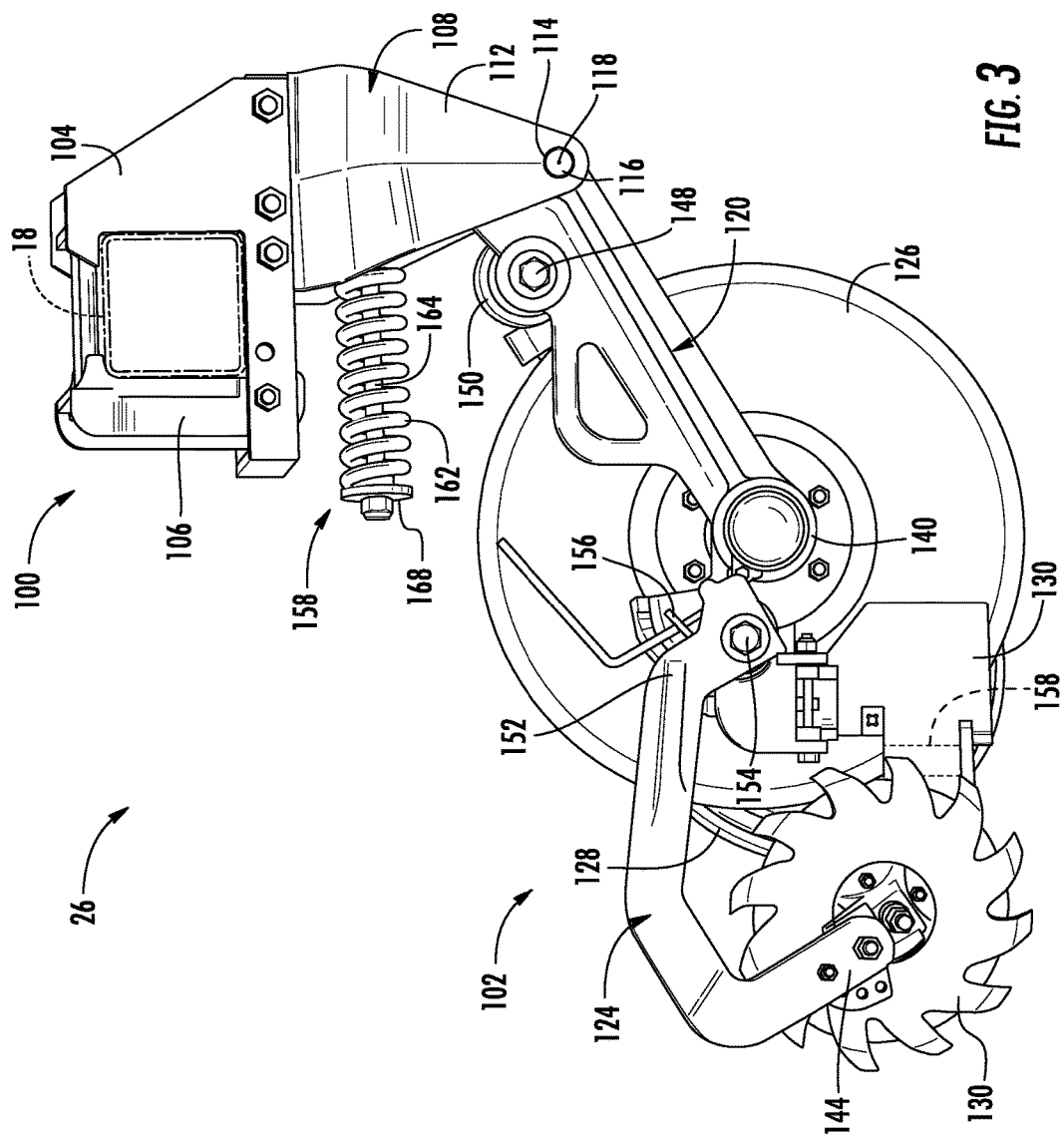
FIG. 3 illustrates an assembled, perspective view of the row unit assembly shown in FIG. 2.
Figure 4:
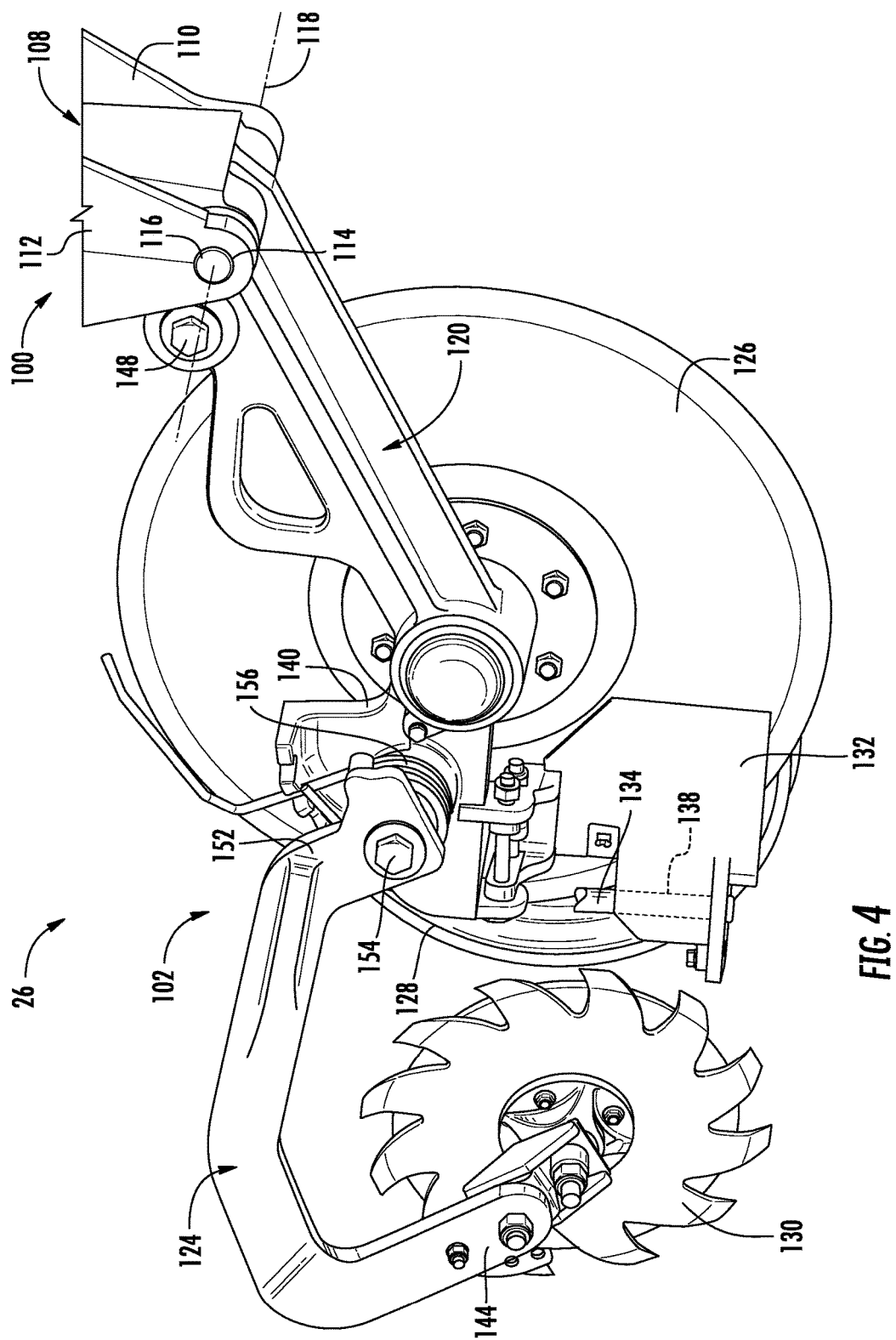
FIG. 4 illustrates a perspective view of a portion of the agricultural row unit of the row unit assembly shown in FIGS. 3 and 4.

Referring now to FIGS. 2-4, several views of one embodiment of a row unit assembly 26 suitable for use with an implement configured to be towed by a work vehicle (e.g., the implement 10 shown in FIG. 1) are illustrated in accordance with aspects of the present subject matter. Specifically, FIG. 2 illustrates a perspective, exploded view of the row unit assembly 26, particularly illustrating a clamp mount 100 of the row unit assembly 26 exploded away from an agricultural row unit 102 of the row unit assembly 26. FIG. 3 illustrates a perspective, assembled view of the row unit assembly 26 shown in FIG. 2, with the row unit 102 coupled to the clamp mount 100. Additionally, FIG. 4 illustrates a front perspective view of a portion of the row unit 102 shown in FIGS. 2 and 3.

In general, the disclosed row unit assembly 26 may include a clamp mount 100 and a row unit 102 configured to be pivotally coupled to the clamp mount 102. The clamp mount 100 may generally be configured to be coupled to a structural frame member of the implement on which the row unit assembly 26 is installed, such as one of the frame members 18 of the implement frame 16 described above. For instance, as shown in FIG. 2, in one embodiment, the frame member 18 may correspond to a rectangular-shaped tubular support beam or bar. However, in other embodiments, the frame member 18 may correspond to any other suitable structural member of an implement frame. By coupling the clamp mount 100 to the frame member 18, the clamp mount 100 may be configured to support the row unit 102 below the frame member 18 relative to the ground.

As shown in the illustrated embodiment, the clamp mount 100 may generally include a first clamp member 104, a second clamp member 106 configured to be pivotally coupled to the first clamp member 104, and a mount base 108 extending downwardly from the first clamp member 104, with the mount base 108 including first and second mount arms 110, 112 for coupling the row unit 102 to the clamp mount 100. In general, the clamp mount 100 may be configured to be coupled to the frame member 18 by clamping the frame member 18 directly between the first and second clamp members 104, 106. Moreover, as particularly shown in FIG. 2, the mount arms 110, 112 of the mount base 108 may define a pair of aligned openings 114 configured to receive a mounting pin 116 for pivotally coupling the row unit 102 to the clamp mount 102. As such, the mounting pin 116 may be configured to define a pivot axis 118 (FIG. 3) about which the row unit 102 is configured to pivot relative to the clamp mount 100 as the row unit 102 is being traversed across a field. The various components of the clamp mount 100 will be described in more detail below with the reference to FIGS. 5-9.

Referring still to FIGS. 2-4, the row unit 104 of the disclosed row unit assembly 26 may generally include a plurality of support members or arms 120, 122, 124 configured to support various components, such as an opener disc 126, a gauge wheel 128, a closing wheel 130, and one or more fluid dispersal components 132, 134, relative to the clamp mount 102. For instance, in several embodiments, the row unit 102 may include a primary support arm 120 configured to be pivotally coupled to the clamp mount 100 and first and second auxiliary support arms 122, 124 configured to be coupled to the primary support arm 120. Specifically, as shown in FIG. 2, a through-hole 136 may be defined through an upper portion of the primary support arm 120 that is configured to receive the mounting pin 116. Thus, when the upper portion of the primary support arm 120 is positioned between the first and second mount arms 110, 112 of the mount base 108 such the openings 114 defined through the mount arms 110, 112 are aligned with the through-hole 136 defined in the primary support arm 120, the mounting pin 116 may be inserted through the aligned openings 114 and through-hole 136 to pivotally couple the primary support arm 120 to the clamp mount 100.

It should be appreciated that the opener disc 126, the gauge wheel 128, and the closing wheel 130 may generally have any suitable configuration known in the art that allows the row unit 102 to function as described herein. For instance, the opener disc 126 may be configured to excavate a trench into the soil as the row unit 102 travels across a field. Additionally, the gauge wheel 128 may be positioned a vertical distance above the bottom edge of the opener disc 126 to establish a desired trench depth for the trench formed by the opener disc 126. Upon injecting fertilizer into the trench via the fluid dispersal components 132, 134, the closing wheel 130 may then direct the excavated soil into the trench.

It should also be appreciated that, in the illustrated embodiment, the fluid dispersal components correspond to a knife 132 (FIG. 4) coupled to the bottom end of the primary support arm 120 that is configured to support associated tubing 134 (FIG. 4) (only a portion of which is shown) in fluid communication with the storage tank (not shown) containing the flowable agricultural product, such as fluid fertilizer. For instance, as shown in FIG. 4, the knife 132 may define a passageway 138 (indicated dashed lines) at its back end that is configured to receive an end of the tubing 134. As such. Plowable agricultural product may be directed from the storage tank through the tubing 134 to the back end of the knife 132, at which point the flowable agricultural product may be dispersed into the trench formed by the opener disc 126. However, it should be appreciated that, in other embodiments, the row unit 102 may include any other suitable fluid dispersion components. For instance, as an alternative to the knife 132, the row unit 102 may include an injection nozzle(s).

In several embodiments, the opener disc 126 may be configured to be supported directly by the primary support arm 120 while the gauge wheel 128 and the closing wheel 130 may be configured to be supported by the first and second auxiliary support arms 122, 124, respectively. For instance, as shown in FIG. 3, the opener disc 126 may be rotationally supported at a bottom end 140 of the primary support arm 120 for rotation relative to the support arm 120. Additionally, as shown FIGS. 2 and 3, the gauge wheel 128 may be rotationally supported at a bottom end 142 of the first auxiliary support arm 122 while the opener disc may be rotationally supported at a rear end 144 of the second auxiliary support arm 124.

Moreover, in several embodiments, the first and second auxiliary support arms 122, 124 may be configured to be pivotally coupled to the primary support arm 120. For instance, as shown in FIG. 2, a top end 146 of the first auxiliary support arm 122 may be pivotally coupled to the primary support arm 120 via pivot bolt or pin 148. As shown in the illustrated embodiment, a biasing member, such as a coil spring 150, may be provided at the location of the pivotal connection defined between the first auxiliary support arm 122 and the primary support arm 120 so as to bias the first auxiliary support arm 122 (and, thus, the gauge wheel 128) downwardly in the direction of the ground. Similarly, as shown in FIGS. 3 and 4, a forward end 152 of the second auxiliary support arm 124 may be pivotally coupled to the primary support arm 120 via pivot bolt or pin 154. As shown in the illustrated embodiment, a biasing member, such as a coil spring 156, may be provided at the location of the pivotal connection defined between the second auxiliary support arm 124 and the primary support arm 120 so as to bias the second auxiliary support arm 124 (and, thus, the closing wheel 130) downwardly in the direction of the around.

Additionally, in several embodiments, the row unit 102 may also include a bias spring assembly 158 coupled to a top end 160 of the primary support arm 120 above the pivot point defined between the primary support arm 120 and the clamp mount 100. As particularly shown in FIG. 2, the bias spring assembly 158 may include a spring 162 and a cantilevered bolt 164 extending through the spring 162. One end of the bolt 164 may be slidably received within an opening 166 defined through the top end 160 of the primary support member 120 while the opposed end may include washers 168 or other suitable members coupled thereto such that the spring 162 is compressed between the top end 160 of the primary support arm 120 and the washers 168. During operation, as the row unit 102 pivots relative to the clamp mount 100 about the pivot point, the bias spring assembly 158 may function to bias the row unit 102 towards the desired orientation relative to the clamp mount 100.

Figure 5:
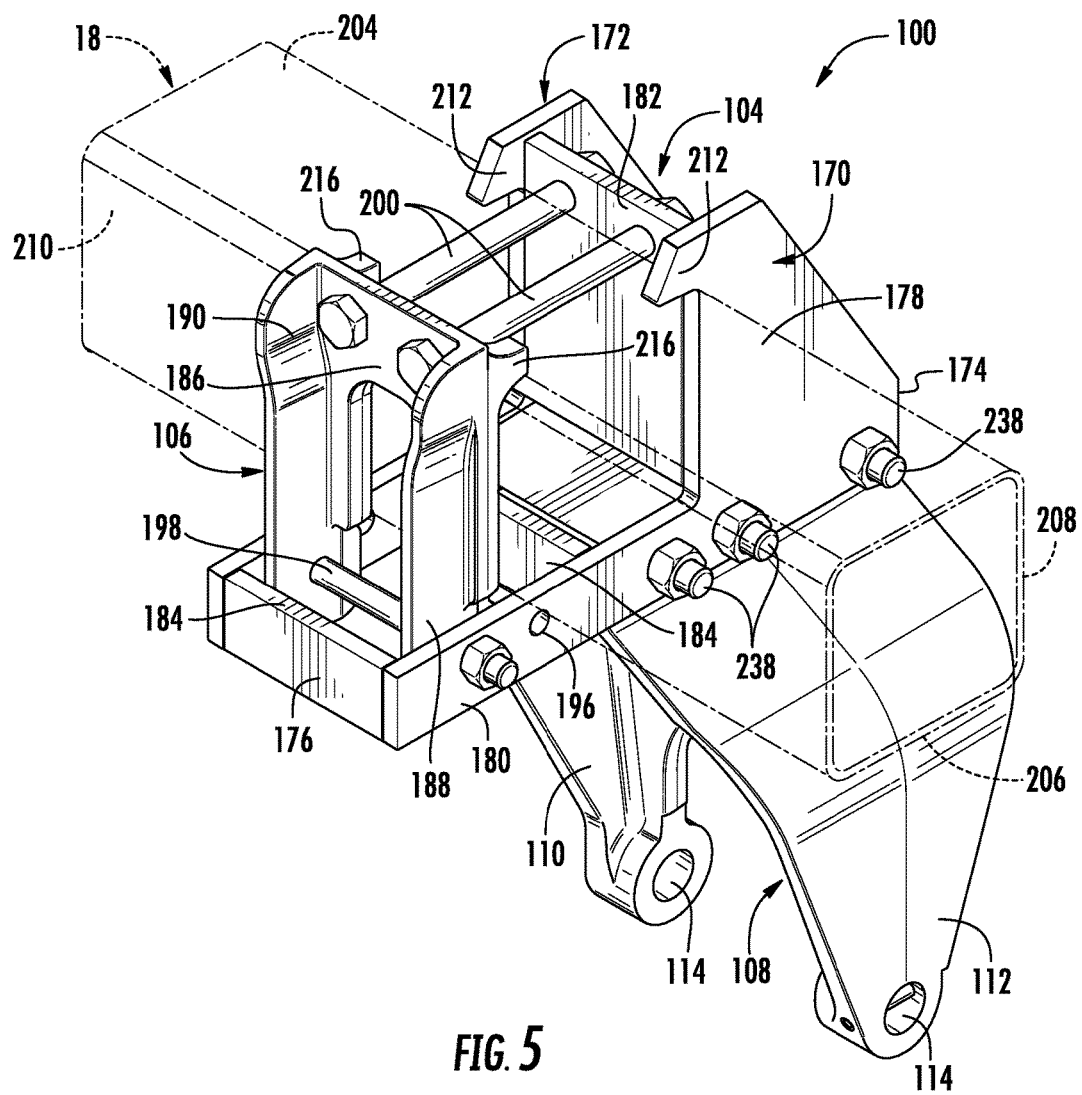
FIG. 5 illustrates a perspective view of one embodiment of a clamp mount suitable for use with the disclosed row unit assembly in accordance with aspects of the present subject matter, with the frame member of the corresponding implement frame being shown in phantom lines.
Figure 6:
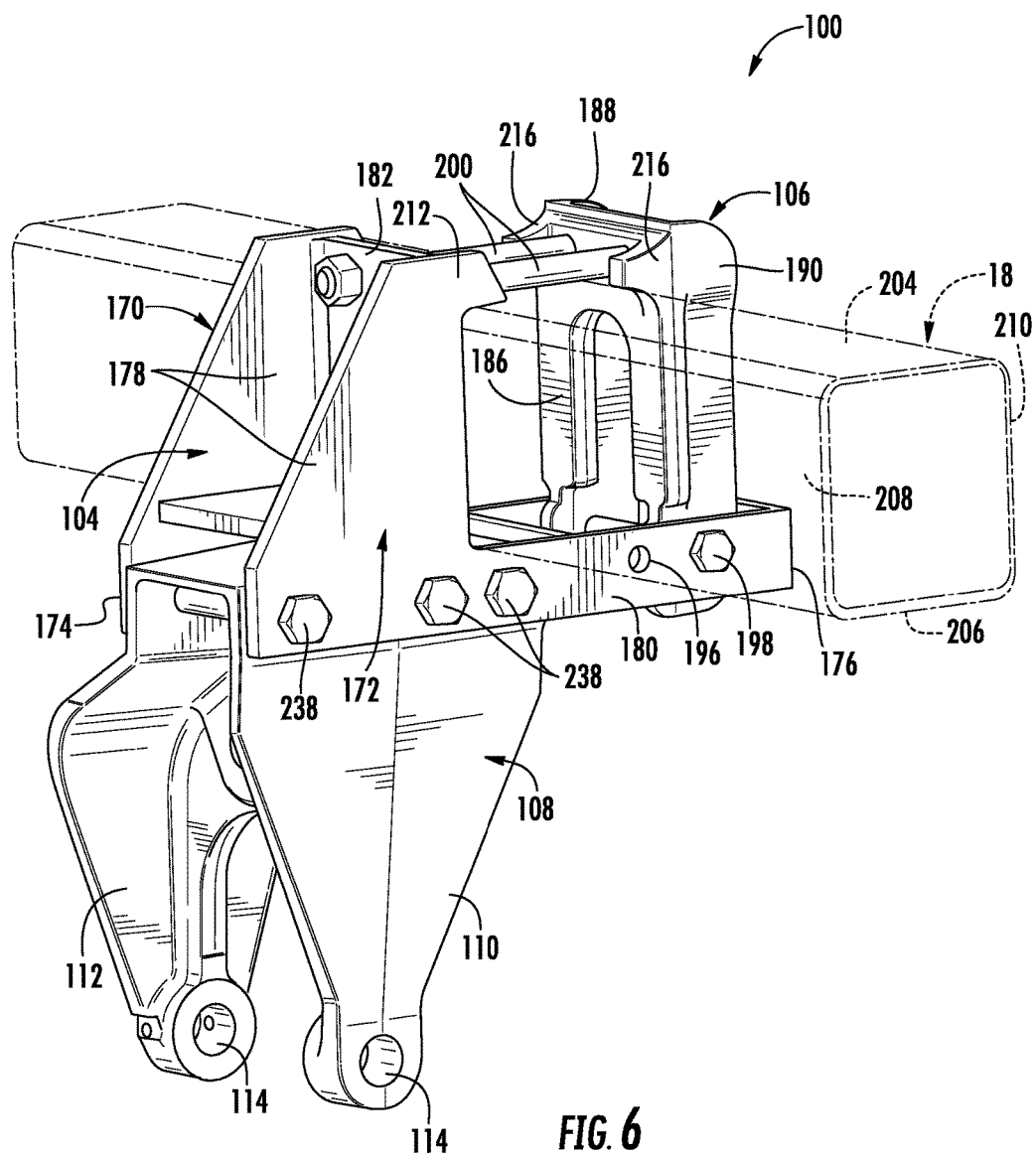
FIG. 6 illustrates another perspective view of the clamp mount shown in FIG. 5.
Figure 7:
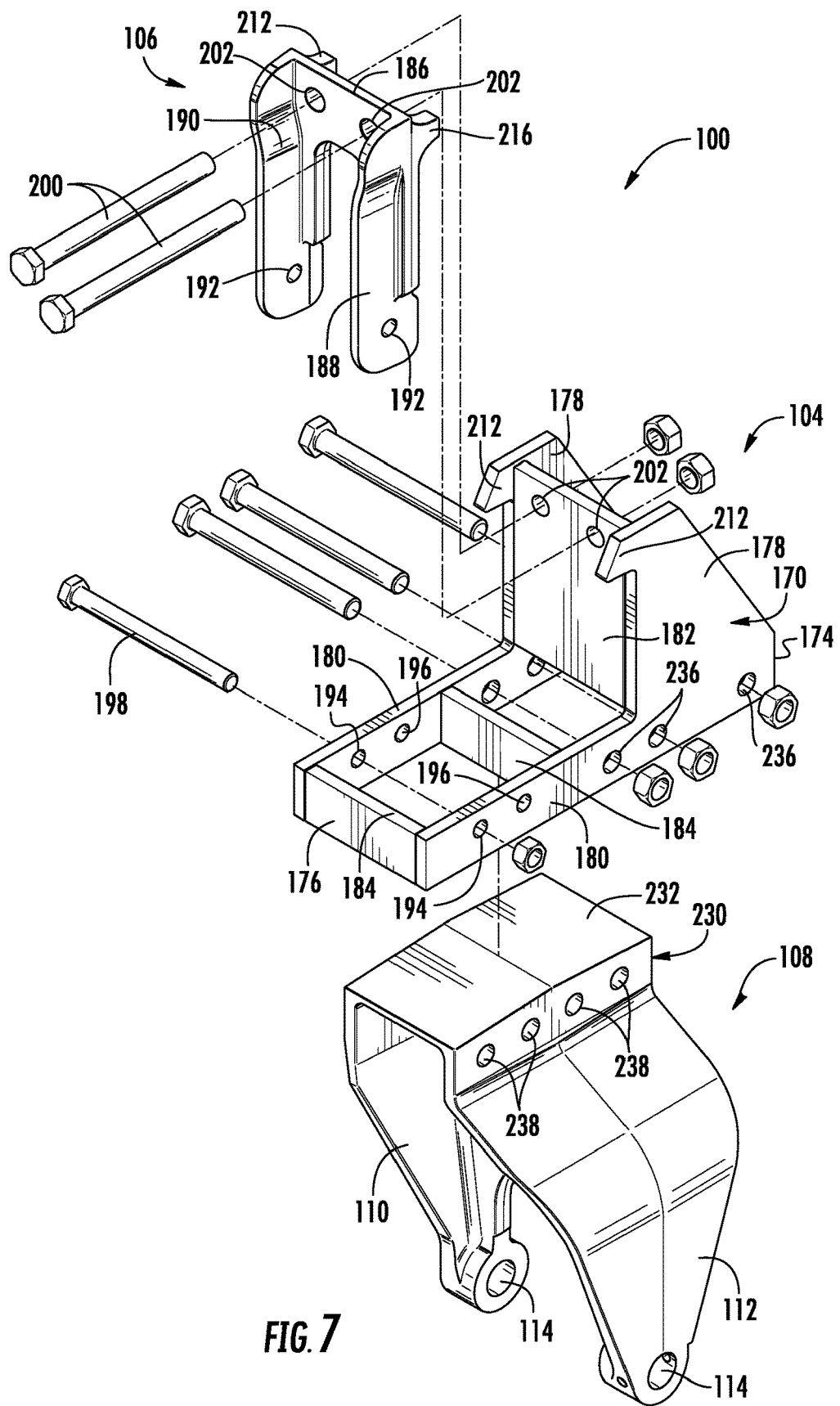
FIG. 7 illustrates a perspective, exploded view of the clamp mount shown in FIG. 5.
Figure 8:
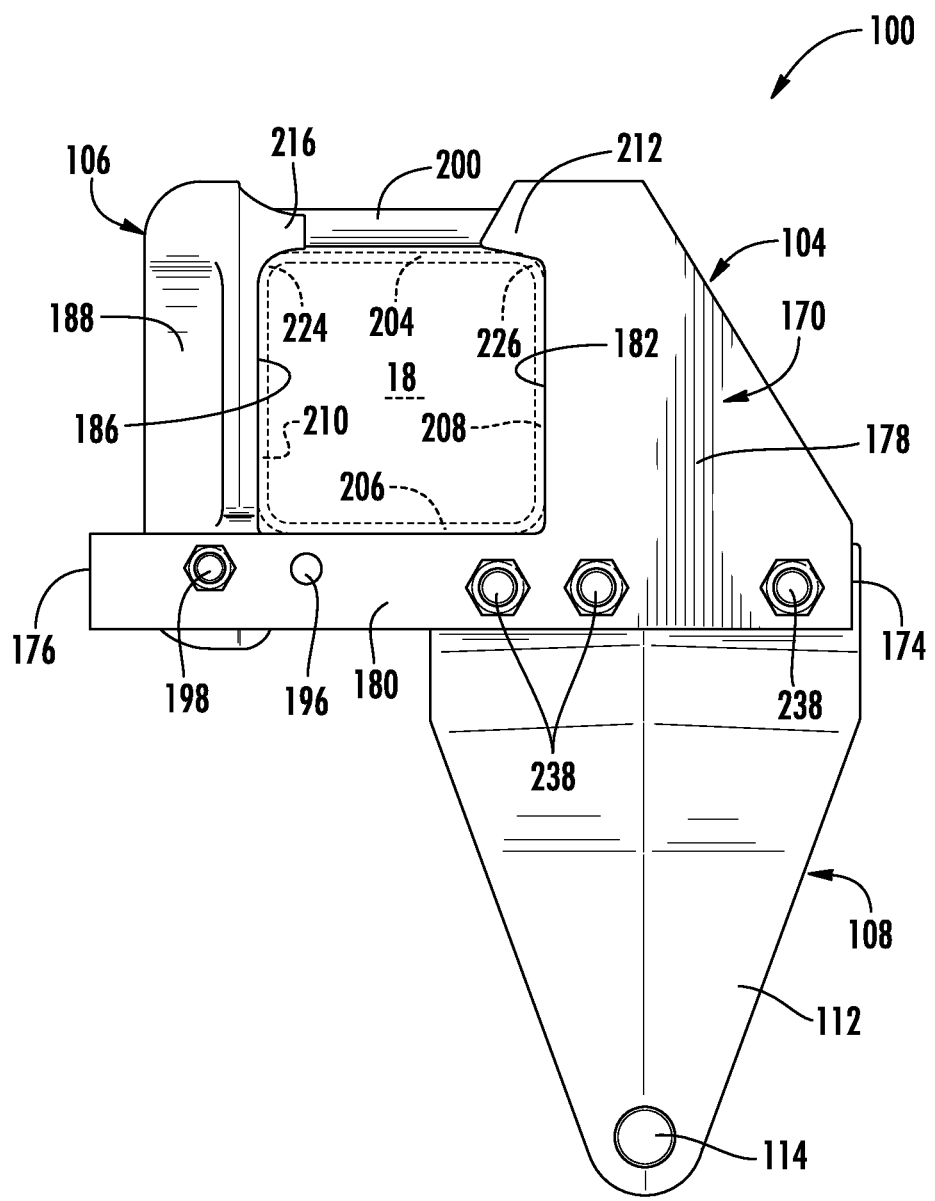
FIG. 8 illustrates a side view of the clamp mount shown in FIG. 5.
Figure 9:
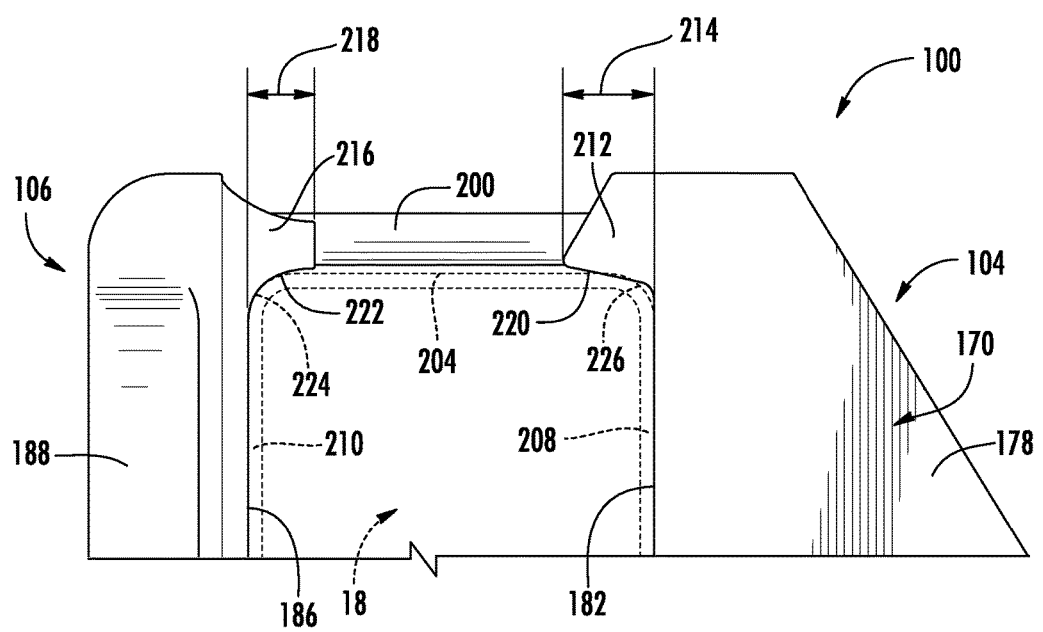
FIG. 9 illustrates a side view an upper portion of the clamp mount shown in FIG. 8.

Referring now to FIGS. 5-9, various views of one embodiment of the clamp mount 100 of the row unit assembly 26 described above with reference to FIGS. 2-4 are illustrated in accordance with aspects of the present subject matter. Specifically, FIGS. 5 and 6 illustrate differing assembled, perspective views of the clamp mount 100 with the frame member 18 shown in phantom lines. FIG. 7 illustrates an exploded, perspective view of the clamp mount 100 shown in FIG. 5 and FIG. 8 illustrates a side view of the clamp mount 100 shown in FIG. 5. Additionally, FIG. 9 illustrates a side view of an upper portion of the clamp mount 100 shown in FIG. 7.

As indicated above, the clamp mount 100 may include a first clamp member 104, a second clamp member 106 pivotally coupled to the first clamp member 104, and a mount base 108 for coupling the clamp mount 100 to the associated row unit 102. As particularly shown in FIG. 7, the first clamp member 104 may include opposed sidewalls (e.g., a first sidewall 170 and a second sidewall 172) extending lengthwise between a forward end 174 and a rear end 176 of the clamp member 104. In one embodiment, each of the sidewalls 170, 172 may include a forward heightened portion 178 (FIG. 7) extending from the forward end 174 of the first clamp member 104 and a rear elongated portion 180 (FIG. 8) extending between the forward heightened portion 178 and the rear end 176 of the first clamp member 104. Additionally, as shown in the illustrated embodiment, the first clamp member 104 may also include a first clamp wall 182 extending transversely between the first and second sidewalls 170, 172 (e.g., between the forward heightened portions 178 of the sidewalls 170, 172). Moreover, as shown in FIG. 7, various structural members, such as transverse supports 184, may be coupled between the first and second sidewalls 170, 172 (e.g., between the rear elongated portions 180 of the side walls 170, 172) to provide additional structural rigidity to the first support member 104.

In addition, as shown in the illustrated embodiment, the second clamp member 106 may generally include a second clamp wall 186 extending between opposed sidewalls (e.g., a first sidewall 188 and a second sidewall 190). As indicated above, the second clamp member 106 may be configured to be pivotally coupled to the first clamp member 104. For instance, as shown in FIG. 7, a pair of pivot holes 192 defined through the sidewalls 188, 190 of the second clamp member 106 may be configured to aligned with a corresponding pair of pivot holes 194, 196 defined through the sidewalls 170, 172 of the first clamp member 104 (e.g., through the rear elongated portions 180 of the sidewalk 170, 172). In such an embodiment, when a bottom portion of the second clamp member 106 is positioned between the sidewalls 170, 172 of the first clamp member 104 so that the pivot holes 192 defined in the second clamp member 106 are aligned with a corresponding pair of pivot holes 194, 196 defined in the first clamp member 104, a suitable pivot pin or bolt 198 may be inserted through the aligned pivot holes to pivotally coupled the second clamp member 106 to the first clamp member 104. The second clamp member 106 may then be pivoted towards and away from the first clamp wall 182 of the first clamp member 104 about the pivot axis defined by the pivot bolt 198.

It should be appreciated that, in several embodiments, two or more pairs of aligned pivot holes may be defined in the sidewalls 170, 172 of the first clamp member 104 to allow the disclosed clamp mount 100 to accommodate frame members 18 having differing horizontal or lateral dimensions. For instance, as shown in the illustrated embodiment, the first clamp member 104 includes a first pair of aligned pivot holes 194 and a second pair aligned pivot holes 196 defined through its sidewalls 170, 172, with the first pair of pivot holes 194 being spaced further apart from the first clamp wall 182 than the second pair of pivot holes 196. As such, when the clamp mount 100 is being coupled to a larger frame member, the second clamp member 106 may be coupled to the first clamp member 106 at the first pair of pivot holes 194 to accommodate the larger frame member. However, when the clamp mount 100 is being coupled to a smaller sized frame member, the second clamp member 106 may be coupled to the first clamp member 104 at the second pair of pivot holes 196.

When the second clamp member 106 is pivotally coupled to the first clamp member 104, the clamp mount 100 may be secured to the frame member 18 by pivoting the second clamp member 106 towards the first clamp wall 182 of the first clamp member 104 until the second clamp wall 186 of the second clamp member 106 contacts or is otherwise positioned adjacent to the frame member 18, at which point suitable clamp bolts 200 may be coupled between the first and second clamp walls 182, 186 to tightly secure the fame member 18 directly between the clamp walls 182, 186. For instance, as shown in FIG. 7, corresponding pairs of clamp holes 202 may be defined through the first and second clamp walls 182, 186 for receiving the clamp bolts 200. Thus, by inserting the clamp bolts 200 through the aligned clamp holes 202 and tightening the bolts 202, the second clamp wall 186 may be pulled towards the first clamp wall 182, thereby allowing the frame member 18 to be clamped between the clamp members 104, 106.

As shown in FIG. 6, in one embodiment, the frame member 18 may include a top side 204, a bottom side 206, a forward or first lateral side 208, and a rear or second lateral side 210, with the first and second lateral sides 208, 210 extending between the top and bottom sides 204, 206. In one embodiment, when the clamp mount 100 is secured to the frame member 18, the first lateral side 208 of the frame member 18 may generally be configured to positioned directly adjacent to the first clamp wall 182 of the first clamp member 104 while the second lateral side 210 of the frame member 18 may generally be configured to be positioned adjacent to the second clamp wall 186 of the second clamp member 106.

Additionally, in several embodiments, the clamp members 104, 106 may include one or more features configured to engage and/or overlap the top side 204 of the frame member 18 when the clamp mount 100 is secured to the frame member 18. For instance, as particularly shown in FIGS. 7-9, each sidewall 170, 172 of the first frame member 104 may include a first upper flange 212 configured to extend outwardly relative to the first clamp wall 182 in the direction of the second clamp wall 186 such that each first upper flange 212 overlaps a portion of the top side 204 of the frame member 18 along a distance 214 (FIG. 9) extending from its first lateral side 208. Similarly, each sidewall 188, 190 of the second frame member 106 may include a second upper flange 216 configured to extending outwardly relative to the second clamp wall 186 in the direction of the first clamp wall 182 such that each second upper flange 216 overlaps a portion of the top side 204 of the frame member 18 along a distance 218 extending from its second lateral side 210.

In several embodiments, the first upper flanges 212 and/or the second upper flanges 216 may be configured to engage or penetrate into a portion of the frame member 18 when the frame member 18 is clamped between the clamp members 104, 106, thereby providing an additional clamping force for retaining the clamp mount 100 relative to the frame member 18. For instance, as shown in FIG. 9, in one embodiment, the first and second upper flanges 212, 216 may include inner surfaces 200, 222 defining differing lateral or horizontal profiles. Specifically, each first upper flange 212 may include a first inner surface 220 defining a substantially planar profile that is angled relative to the top side 204 of the frame member 18 and each second upper flange 216 may include a second inner surface 222 defining a substantially curved profile that matches the radius of curvature of the rounded corner 224 defined between the top side 204 and the second lateral side 210 of the frame member 18. In such an embodiment, when the clamp bolts 202 are tightened to clamp the frame member 18 between the first and second clamp members 104, 106, a portion of the angled inner surface 220 of each first upper flange 212 may penetrate into a portion of the rounded corner 226 defined between the top side 204 and the first lateral side 208 of the frame member 18 while the curved inner surfaces 222 of the second upper flanges 216 may extend or wrap around the adjacent rounder corner 224 of the frame member 18.

It should be appreciated that, in other embodiments, the configuration of the upper flanges 212, 216 may be reversed, with the second upper flanges 216 defining angled inner surfaces configured to penetrate into the frame member 18 and the first upper flanges 212 defining curved inner surfaces configured to extend or wrap around the adjacent upper corner of the frame member 18. Alternatively, all of the upper flanges 212, 216 may be configured to penetrate into portions of the frame member 18 when the clamp bolts 202 are tightened to clamp the frame member 18 between the first and second clamp members 104, 106. In a further embodiment, all of the upper flanges 212, 216 may be configured to defined curved inner surfaces that extend or wrap around the adjacent upper corners of the frame member 18.

Referring particularly to FIG. 7, as indicated above, the mount base 108 of the disclosed clamp mount 100 may include first and second mount arms 110, 112 to which the primary support arm 120 of the agricultural row unit 104 is configured to be pivotally coupled (e.g., via the mounting pin 116). Additionally, as shown in FIG. 7, the mount base 108 may also include an upper connector portion 230 configured to be coupled to the first clamp member 104, with the first and second mount arms 110, 112 extending outwardly from the upper connector portion 230. In the illustrated embodiment, the upper connector portion 230 includes a mounting head 232 defining a plurality of bolt holes 234 configured to be aligned with corresponding bolt holes 236 defined in the first clamp member 104 (e.g., through the sidewalls 170, 172 of the clamp member 104). In such an embodiment, when the mounting head 212 of the mount base 108 is inserted between the sidewalls 170, 172 of the first clamp member 104 so that the bolt holes 234 of the mount base 108 are aligned with the bolt holes 236 of the first clamp member 104, suitable fasteners (e.g., bolts 238) may be inserted through the aligned bolt holes 234, 236 to couple the first clamp member 104 to the mount base 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A row unit assembly configured to be supported on a frame member of a work vehicle implement, the frame member including a top side, a bottom side, and first and second lateral sides, the row unit assembly comprising:
    a clamp mount configured to be coupled to the frame member, the clamp mount including a first clamp member and a second clamp member pivotally coupled to the first clamp member, the first clamp member including a first clamp wall spaced apart from a second clamp wall of the second clamp member such that, when the frame member is clamped between the first and second clamp walls, the first clamp wall is configured to be positioned adjacent to the first lateral side of the frame member and the second clamp wall is configured to be positioned adjacent to the second lateral side of the frame member, the first clamp member further including a first flange extending outwardly relative to the first clamp wall in the direction of the second clamp wall such that the first flange is configured to overlap the frame member along at least a portion of the top side of the frame member, the second clamp member further including a second flange extending outwardly relative to the second clamp wall in the direction of the first clamp wall such that the second flange is configured to overlap the frame member along at least a portion of the top side of the frame member; and
    an agricultural row unit including at least one support arm pivotally coupled to the clamp mount, the at least one support arm configured to support an opener disc, a gauge wheel, and a closing wheel relative to the clamp mount;
    wherein at least one of the first flange or the second flange defines an inner surface having a substantially planar profile that is angled relative to the top side of the frame member such that the at least one of the first flange or the second flange penetrates into a portion of an adjacent corner of the frame member when the frame member is clamped between the first and second clamp walls.

2. The row unit assembly of claim 1, wherein the first clamp member includes first and second sidewalls between which the first clamp wall extends, the second clamp member being pivotally coupled to the first and second sidewalls.

3. The row unit assembly of claim 2, wherein the second clamp member is pivotally coupled to the first and second sidewalls via a pivot bolt extending through a portion of the second clamp member between the first and second sidewalls.

4. The row unit assembly of claim 3, wherein the first and second sidewalls define at least two pairs of pivot openings for receiving the pivot bolt, each pair of the at least two pairs of pivot openings being spaced apart from the first clamp wall of the first clamp member by a different distance.

5. The row unit assembly of claim 1, further comprising first and second clamp bolts coupled between the first and second clamp walls.

6. The row unit assembly of claim 1, wherein the first flange defines a first inner surface and the second flange defines a second inner surface, the first inner surface defining a profile that differs from a profile of the second inner surface.

7. The row unit assembly of claim 6, wherein one of the first inner surface or the second inner surface defines the substantially planar profile that is angled relative to the top side of the frame member such that one of the first flange or the second flange penetrates into the portion of the adjacent corner of the frame member and the other of the first inner surface or the second inner surface defines a substantially curved profile that is complementary to a radius of curvature of a separate adjacent corner of the frame member.

8. The row unit assembly of claim 1, wherein the clamp mount further includes a mount base coupled to the first clamp member and extending outwardly therefrom in a direction of the agricultural row unit, the at least one support arm of the agricultural row unit being pivotally coupled to the mount base.

9. The row unit assembly of claim 8, wherein the mount base includes first and second mount arms, the at least one support arm being pivotally coupled to the mount base between the first and second mount arms.

10. The row unit assembly of claim 8, further comprising a bias spring assembly coupled to a top end of the at least one support arm at a location above a pivot point defined between the at least one support arm and the mount base, the at least one bias spring assembly being configured to bias the at least one support arm in a rotational direction relative to the clamp mount.

11. The row unit assembly of claim 1, wherein the at least one support arm comprises a primary support arm and at least one auxiliary support arm, the primary support arm being pivotally coupled to the clamp mount and the at least one auxiliary support arm being pivotally coupled to the primary support arm.

12. The row unit assembly of claim 11, wherein the primary support arm is configured to directly support the opener disc and the at least one auxiliary support arm is configured to directly support at least one of the gauge wheel or the closing wheel.

13. The row unit assembly of claim 1, further comprising a fluid dispenser component supported by the at least one support arm, the fluid dispenser component configured to dispense a flowable agricultural product.

14. An agricultural implement, comprising:
an implement frame, the implement frame including at least one frame member, the at least one frame member including a top side, a bottom side, and first and second lateral sides;
a plurality of row unit assemblies supported by the implement frame, each row unit assembly comprising:
a clamp mount coupled to the at least one frame member, the clamp mount including a first clamp member and a second clamp member pivotally coupled to the first clamp member, the first clamp member including a first clamp wall spaced apart from a second clamp wall of the second clamp member such that, when the at least one frame member is clamped between the first and second clamp walls, the first clamp wall is positioned adjacent to the first lateral side of the at least one frame member and the second clamp wall is positioned adjacent to the second lateral side of the at least one frame member, the second clamp member further including a flange extending outwardly relative to the second clamp wall in the direction of the first clamp wall such that the flange overlaps the at least one frame member along at least a portion of the top side of the at least one frame member; and
an agricultural row unit including at least one support arm pivotally coupled to the clamp mount, the at least one support arm configured to support an opener disc, a gauge wheel, and a closing wheel relative to the clamp mount;
wherein:
the clamp mount further includes a mount base coupled to the first clamp member;
the at least one support arm is pivotally coupled to the mount base at a pivot point; and
each row unit further comprises a bias spring assembly coupled to the at least one support arm at a location vertically between a mounting head of the mount base to which the first clamp member is coupled and the pivot point defined between the at least one support arm and the mount base.

15. The agricultural implement of claim 14, wherein the first clamp member includes first and second sidewalls between which the first clamp wall extends, the second clamp member being pivotally coupled to the first and second sidewalls.

16. The agricultural implement of claim 14, wherein the flange of the second clamp member corresponds to a second flange and wherein the first clamp member further includes a first flange extending outwardly relative to the first clamp wall in the direction of the second clamp wall such that the first flange overlaps the at least one frame member along at least a portion of the top side of the at least one frame member.

17. The agricultural implement of claim 16, wherein at least one of the first flange or the second flange defines an inner surface having a substantially planar profile that is angled relative to the top side of the frame such that the at least one of the first flange or the second flange penetrates into an adjacent rounded corner of the at least one frame member when the at least one frame member is clamped between the first and second clamp walls.

18. The agricultural implement of claim 17, wherein:
the first flange defines a first inner surface and the second flange defines a second inner surface;
one of the first inner surface or the second inner surface defines the substantially planar profile that is angled relative to the top side of the at least one frame member such that one of the first flange or the second flange penetrates into the adjacent rounded corner of the at least one frame member and the other of the first inner surface or the second inner surface defines a substantially curved profile that is complementary to a radius of curvature of a separate adjacent rounded corner of the at least one frame member.

19. The agricultural implement of claim 14, wherein the mount base includes first and second mount arms, the bias spring assembly being coupled to the at least one support arm at a location between the first and second mount arms.

* * * * *